US008688664B2

(12) United States Patent
Pineau et al.

(10) Patent No.: US 8,688,664 B2
(45) Date of Patent: Apr. 1, 2014

(54) UPDATING FLOOR-SPECIFIC INFORMATION

(75) Inventors: Raymond J. Pineau, Windham, NH (US); Erik Barron, Brookline, NH (US); Michael Lynch, Derry, NH (US)

(73) Assignee: Captivate, LLC, Chelmsford, MA (US)

( * ) Notice: Subject to any disclaimer, the term of this patent is extended or adjusted under 35 U.S.C. 154(b) by 1690 days.

(21) Appl. No.: 11/760,362

(22) Filed: Jun. 8, 2007

(65) Prior Publication Data

US 2008/0306961 A1 Dec. 11, 2008

(51) Int. Cl.
*G06F 17/30* (2006.01)
*G09G 5/00* (2006.01)
*G05B 15/00* (2006.01)
*B66B 1/34* (2006.01)
*B66B 5/00* (2006.01)
*G06F 15/16* (2006.01)

(52) U.S. Cl.
CPC *G06F 17/30* (2013.01); *G09G 5/00* (2013.01); *G05B 15/00* (2013.01); *B66B 1/34* (2013.01); *B66B 5/00* (2013.01); *G06F 15/16* (2013.01)
USPC ........... 707/705; 707/770; 707/805; 345/650; 345/661; 700/83; 187/391; 187/396; 709/203; 709/206

(58) Field of Classification Search
CPC ........... G06F 17/30; G06F 15/16; B66B 1/34; B66B 5/00
USPC ............ 707/1, 10, 100, 104.1, 200, 705, 770, 707/805; 709/203, 218–225, 206; 187/247, 187/396–397, 393, 414, 391; 700/83; 345/650, 661
See application file for complete search history.

(56) References Cited

U.S. PATENT DOCUMENTS

| 4,771,865 | A | * | 9/1988 | Hinderling | 187/391 |
|---|---|---|---|---|---|
| 5,010,472 | A | * | 4/1991 | Yoneda et al. | 700/49 |
| 5,200,583 | A | * | 4/1993 | Kupersmith et al. | 187/384 |
| 5,257,176 | A | * | 10/1993 | Uetani | 700/83 |
| 5,616,894 | A | * | 4/1997 | Nieminen et al. | 187/247 |
| 5,844,181 | A | * | 12/1998 | Amo et al. | 187/396 |
| 5,955,710 | A | * | 9/1999 | DiFranza | 187/396 |
| 6,073,727 | A | * | 6/2000 | DiFranza et al. | 187/396 |

(Continued)

FOREIGN PATENT DOCUMENTS

| JP | 04292384 | 10/1992 |
|---|---|---|
| JP | 08227491 | 9/1996 |
| JP | 2002-48569 | 2/2002 |
| WO | WO 2008/088783 | * 7/2008 |

OTHER PUBLICATIONS

Atsuya Fujino, et al. "An Elevator Group Control System with Floor-Attribute Control Method and System Optimization Using Genetic Algorithms", IEEE Transactions on Industrial Electronics, vol. 44, No. 4, Aug. 1997, pp. 546-552.*

*Primary Examiner* — Srirama Channavajjala
(74) *Attorney, Agent, or Firm* — Occhiuti & Rohlicek LLP

(57) ABSTRACT

A method for updating floor information for display by an elevator in a remote property includes receiving, from a property server, data indicative of a floor for which the elevator lacks floor information, receiving, from a remotely executing process, new floor information for the floor; storing the new floor information in a floor information database; receiving, from the property server, a request identifying the remote property and requesting updated floor information for the remote property; and retrieving updated floor information from the floor-information database.

18 Claims, 3 Drawing Sheets

(56) References Cited

U.S. PATENT DOCUMENTS

| | | | |
|---|---|---|---|
| 6,947,942 B1* | 9/2005 | Wu et al. ............................... 1/1 |
| 6,981,576 B2* | 1/2006 | Amo et al. .................... 187/396 |
| 7,249,250 B1* | 7/2007 | Akasaka et al. .................. 713/1 |
| 7,270,219 B2* | 9/2007 | Amo et al. .................... 187/391 |
| 7,319,966 B2* | 1/2008 | Friedli et al. ...................... 705/1 |
| 2004/0059586 A1 | 3/2004 | Brimberry |
| 2005/0167205 A1* | 8/2005 | Yamakawa et al. ........... 187/391 |
| 2006/0259777 A1* | 11/2006 | Izawa ............................ 713/186 |
| 2007/0103288 A1* | 5/2007 | Herard, Jr. .................... 340/506 |
| 2007/0206001 A1* | 9/2007 | McKay ......................... 345/418 |

* cited by examiner

UPDATING FLOOR-SPECIFIC INFORMATION

FIELD OF DISCLOSURE

This disclosure relates to elevator display systems, and in particular, to the display of floor-specific information.

BACKGROUND

In office buildings around the world, there now exist elevator displays units. These elevator display units provide information to entertain and inform passengers as they make the journey between the elevator lobby and a selected floor. The displayed information often includes general information, such as news and weather, and commercial information, such as advertising messages.

Some elevator display units also show floor-specific information, such as the name of a particular floor, a list of tenants on that floor, the use to be made of a particular floor, information about restricted access to that floor, or any other information associated with a particular floor.

Before it can display this information, the elevator display unit must somehow acquire the information. This can be done by initially programming each elevator display unit at the time of its installation.

A difficulty with this solution is that floor information is not static. As tenants change, information must constantly be updated. One could, in principle, reprogram each elevator display unit in each elevator in a building every time a change is required. However, for a property manager who must manage many buildings, some of which are far away, this can be a laborious undertaking.

SUMMARY

In one aspect, the invention includes a method for updating floor information for display by an elevator in a remote property. Such a method includes receiving, from a property server, data indicative of a floor for which the elevator lacks floor information, receiving, from a remotely executing process, new floor information for the floor, storing the new floor information in a floor information database, receiving, from the property server, a request identifying the remote property and requesting updated floor information for the remote property; and retrieving updated floor information from the floor-information database.

Practices of the invention also include those in which receiving new floor information includes receiving a name of the floor, those in which receiving new floor information includes receiving information representative of an occupant of the floor, and those in which receiving new floor information comprises receiving data from a browser via the internet.

In other practices, receiving a request for updated floor information includes receiving a request from the property server via the internet.

In another aspect, the invention includes a system for updating floor information for display in elevators associated with remote properties. Such a system includes a processor, a network interface for providing communication with a network, and a mass storage medium in communication with the processor for storage of floor information. The processor is configured to receive, from a remote property, data indicative of a floor for which an elevator lacks floor information, to receive, from a remotely executing process, new floor information for the floor for which the elevator lacks floor information, and to store the new floor information in the main storage medium.

Additional embodiments include those that include a plurality of property servers for transmitting data indicative of a floor for which the elevator lacks floor information, and those that include an elevator display unit in data communication with one of the property servers.

Alternative embodiments also include those in which the property server includes a building server, and those in which the property server is disposed within an elevator.

In another aspect, the invention includes a computer-readable medium having encoded thereon software for updating floor information for display by an elevator, the software comprising instructions for executing any combination of the foregoing methods.

These and other features will be apparent from the following detailed description and the accompanying figures, in which:

DESCRIPTION

Figure 1:
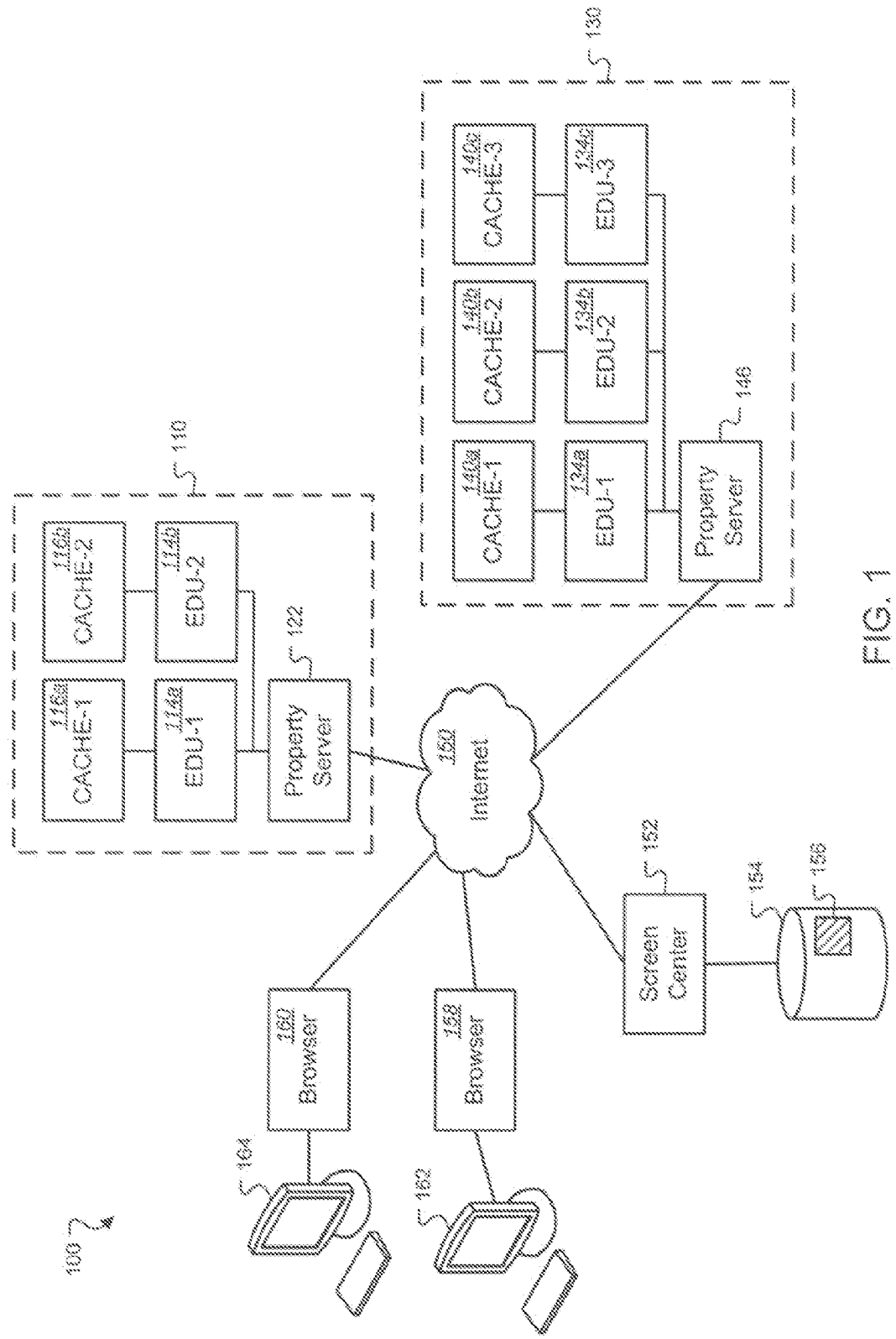
FIG. 1 is a block diagram showing a floor information management system.

Referring to FIG. 1, a floor information management system 100 provides floor information to a plurality of properties 110, 130. Examples of floor information include tenant information, building information, floor identifiers, and information about a floor's function. Each property 110, 130 includes elevator display units 114a-b, 134a-c, coupled to displays located in elevators. The elevator display units 114a-b, 134a-c cause display of floor information on the elevator displays.

Each elevator display unit 114a-b communicates with a corresponding cache 116a-b in which is stored a copy of the floor information. In the illustrated embodiment, each elevator display unit 134a-c has its own cache 140a-c. In other embodiments, multiple elevator display units 134a-c share the same cache. In such cases, the elevator display units 134a-c may access the shared cache simultaneously to retrieve floor information for display. In one example, the caches 116a-b, 140a-c include a volatile memory device, such as a dynamic random access memory (DRAM), a static random access memory (SRAM), or other random access memory. In another example, the caches 120, 122 include a non-volatile memory device, such as a rotating disk drive (e.g., a hard disk drive) or a flash memory. The elevator display unit 114a retrieves floor information from the cache 116a based on the current position of its associated elevator.

The elevator display units 114a-b, 134a-c communicate with corresponding property servers 122, 146. The property servers 122, 146 exchange messages with one or more of the elevator display units. The property servers 122, 146 may also write messages and data, including floor information, in the caches 116a-b, 140a-c. For example, the property server 122 may receive a message (e.g., an error message) from and transmit a message (e.g., a notification of a floor information update) to the elevator display unit 114*a*.

The property servers 122, 146 are connected to a computer network 150. One such network 150 is the internet. As a result of this connection, the property servers 122, 146 can exchange data with remote computers also connected to the network 150. In particular, the property servers 122, 146 can establish communication with a screen center 152.

The screen center 152 is a process executing on a remote computer and connected to a screen center database 152. The screen center database 152 includes a table 156 for storing floor data representative of floor information for the properties 110, 130.

Floor data stored in the screen center database 154 can be accessed locally through the screen center 152, and remotely using the network 150. The screen center 152 is configured for managing data in the screen center database 154, for example, by reading floor data from or writing floor data to the screen center database 154.

The screen center 152 provides a web-based administration interface for enabling remote property managers to manage information in the screen center database 154 via the network 150. These remote users execute browsers 158, 160 on remote terminals 162, 164 to manage information in the screen center database 154. Examples of remote terminals 162, 164 include computing devices, such as desktop computers, laptop computers, or other computer devices (e.g., cell phones), that are capable of connecting to the network 150. Using the browsers 154, 156, the property managers can access the web-based administration interface to edit the floor information in the screen center database 158.

In operation, the property managers use their browsers 158, 160 to cause the screen center 152 to update floor information on the screen center database 154. The property servers 122, 146 periodically retrieve floor information from the screen center database 154 by, for example, transmitting, through the network 150, a command to the screen center 152 to retrieve the floor information.

In some embodiments, the property servers 122, 146 store the retrieved floor information in the caches 116*a-b*, 140*a-c*. After saving the floor information, the property server 146 notifies its associated elevator display units 134*a-c*. Following notification, the elevator display units 134*a-c* retrieve the floor information from the cache, including any updated information.

As an illustrative example, the property servers 122, 146 are configured to detect any updates to the screen center database 154. In some embodiments, the property servers 122, 146 do so by inspecting a timestamp associated with the table 156. In one example, a property server 122 stores a timestamp associated with a previously retrieved table. By comparing the timestamp of the table 156 and this stored timestamp, the property server 122 can determine whether the table 156 has been updated since it was last read.

In one embodiment, the property server 122 periodically (e.g., hourly, daily, weekly, etc.) inspects the screen center database 154 to identify or receive updated floor information. In another embodiment, the property server 122 inspects the records in the screen center database 154 upon connection to the screen center 152. Following detection of an update, the property server 122 retrieves all floor information from the screen center database 154 and writes it to the caches 116*a-b* or 140*a-c*. After writing the updated information, the property servers 122, 146 can notify the elevator display units 114*a-b*, 134*a-c*, which then retrieve and display the updated information.

In some embodiments, an elevator display unit 114*a* determines whether there exist floors for which corresponding floor information is missing. For example, the elevator display unit 114*a* can determine all the floors served by a particular elevator by retrieving floor names or floor IDs from, for example, an elevator controller, or the cache 116*a*. Using the floor names or the floor IDs, the elevator display unit 114*a* determines whether any floor information is missing. For example, the elevator display unit 114*a* may retrieve a list of floor IDs from the elevator controller. By matching the retrieved floor IDs with the floor information stored in the cache 116*a*, the elevator display unit 114*a* determines which floors lack floor information. After determining which floors lack floor information, the elevator display units 114*a* generates a message identifying these floors to the property server 122.

In response to such a message, the property server 122 notifies the screen center 152 that certain floors lack floor information. The screen center 152 then adds a row for each missing floor to the table 160, and transmits a message to an appropriate browser 154 to invite the property manager for the corresponding property 110 to provide floor information for the added row.

Figure 2:
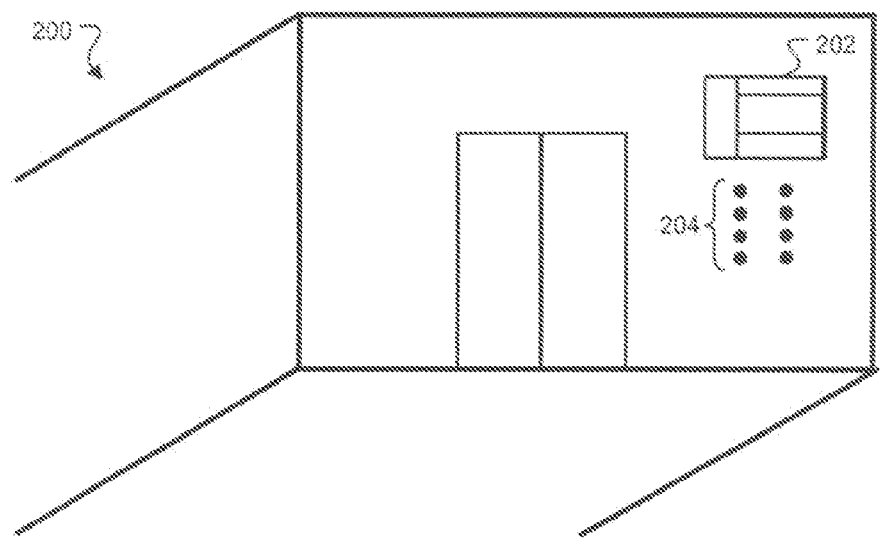
FIG. 2 is a schematic diagram showing an elevator that includes an elevator display unit; associated with the floor information management system of FIG. 1.
Figure 3:
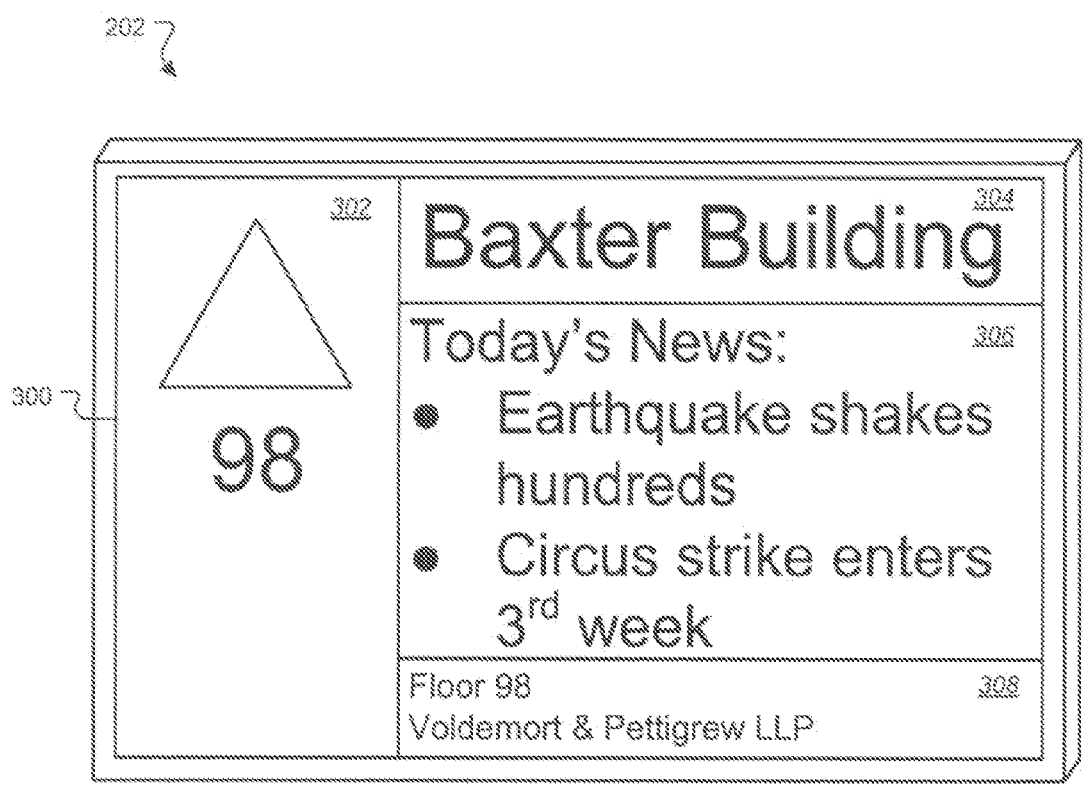
FIG. 3 is a schematic diagram showing the elevator display unit of FIG. 2.

FIG. 2 is a schematic diagram showing the interior of an elevator 200 that includes an elevator display unit 202 and a plurality of floor-selection buttons 204. Referring now to FIG. 3, the elevator display unit 202 includes an elevator display 300 for displaying floor information. The elevator display 300 includes several display areas, such as a position indicator area 302, a building name area 304, a news information area 306, and a tenant information area 308.

The position indicator area 302 displays the elevator's current floor and direction of travel. The building name area 304 displays a name of the building containing the elevator 200. The news information area 306 displays news, or any other general and commercial information. In some embodiments, the news information area 306 is divided into additional display areas for concurrent display of information, such as stock prices, weather information, and/or advertisements. The tenant information area 308 displays tenant information for the current floor.

In some embodiments, the elevator display unit 202 includes only some of the display areas 302, 304, 306, 308. For example, an elevator display unit 202 may only display tenant information. In another example, the elevator display unit 202 may only display position of the elevator. In another example, the elevator display unit 202 may display only the news information and the building name. The positions and sizes of the display areas 302, 304, 306, 308 are illustrative only and can vary from one elevator display unit to another.

In some embodiments, the elevator display unit 202 may also include other display areas. For example, the elevator display unit 202 may include a direction information area that provides directions (e.g. turn left) to reach each tenant on a particular floor. In some embodiments, the elevator display unit 202 retrieves the directions from a cache (e.g., the caches 116*a-b*). In other embodiments, the elevator display unit 202 is configured to determine a location of the elevator 200 relative to the tenants in the current floor. Based on the elevator location and the tenant locations, the elevator display unit 202 can compute the directions to each of the tenants from the elevator 200. In such cases, elevator display units on elevators on opposite sides of a lobby will display directions that are mirror images of each other.

In some embodiments, the elevator display unit 202 may be configured to detect which of the floor buttons 204 are selected. Based on the selected floor buttons, the elevator display unit 202 determines which floor is the next stop and displays the tenant information for that floor.

In another embodiment, the elevator display unit 202 allow elevator passengers to browse tenant information on each floor. In such an embodiment, the buttons 204 can include a browse button. If both the browse button and one of the floor buttons are selected, the elevator display unit 202 retrieves and displays the tenant information for the selected floor. Accordingly, a passenger can search a location of a specific tenant using the elevator display unit 202 and the buttons 204.

Figure 4:
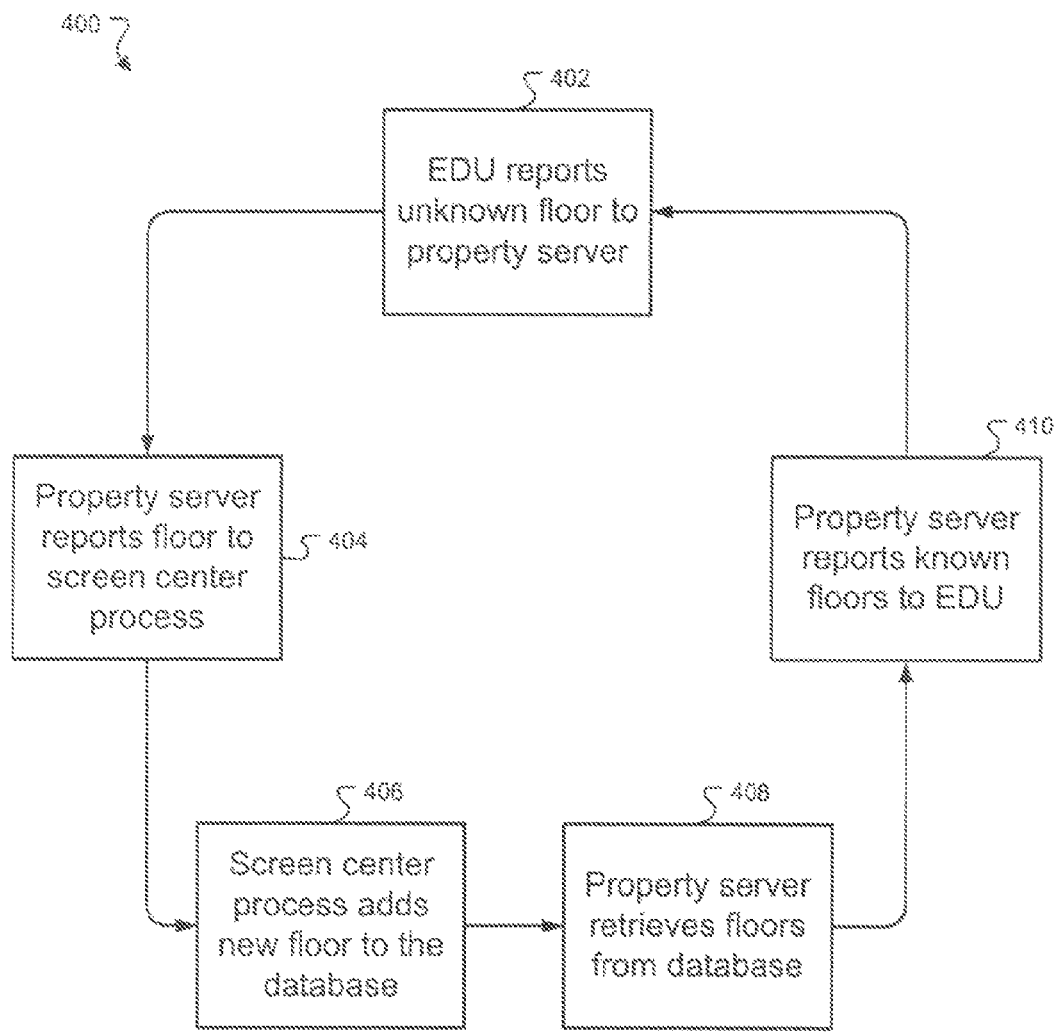
FIG. 4 is a flowchart illustrating a method for updating floor information in an elevator display unit.

FIG. 4 is a flowchart illustrating an example method 400 implemented by the floor information management system 100 for updating floor information in an elevator display unit. In some embodiments, the method 400 can be used to provide an elevator display unit with information concerning a floor of a building served by an elevator.

The method 400 includes a step in which the elevator display unit reports one or more unknown floors to a property server 122 (step 402). For example, the property server 122 may receive an error message from the elevator display unit 114b indicating that floor information for some specified floors are missing.

The property server then reports the missing floor information to the screen center 152 (step 404). In some cases, the property server 122 reports the unknown floors to the screen center 152. In other cases, the property server 122 transmits a message to the screen center 152 to request for the missing floor information.

Next, the screen center process adds an entry for the new floor to the screen center database 154 (step 406). The screen center 152 typically adds rows representing the unknown floors to the table 156. In some examples, the screen center 152 transmits a message to the browsers 158, 160 to request for floor information for the added rows.

Periodically, the property server 122 retrieves floor information from the database (step 408). In some cases, the property server 122 retrieves floors from the screen center database 154 when the property server 122 is connected to the screen center 152. Upon doing so, the property server 122 retrieves any updated floor information stored in the screen center database 154. In some examples, the screen center database 154 includes an updated table having information that was previously missing from the table 156.

Following retrieval of floor information, the property server reports the floor information to the elevator display unit (step 410). In some cases, the property server 122 updates the file containing the floor information in the caches 116a-b after retrieving the updated information. The elevator display unit 202 then retrieves the updated floor information and determines whether there continues to be missing floor information (step 402).

As used herein, the term "property server" includes building servers that are associated with a particular building and that provide information to elevator display units in that building, as well as servers that are associated with a set of buildings and that provide information to elevator display units for all buildings in the set of buildings. The term "property server" also includes a processing system associated with only a single elevator display unit. In such cases, the "property server" can be located within the elevator itself.

As used herein, the term "tenant" refers to any occupant of a portion of a building, and is not intended to suggest the existence of a landlord/tenant relationship or any other contractual relationship.

Although various embodiments have been described, further embodiments are possible. For example, in some embodiments, the elevator display unit 202 is configured using the remote terminals 162 or 164. In other embodiments, different portions of floor information are displayed on the elevator display 300. For example, in some embodiments, the elevator display unit 202 displays only the position of the elevator 300. In other embodiments, the elevator display unit 202 displays only floor information, including tenant information and directions, to each of the tenants. In one embodiment, a property manager selects what floor information to display and where to display it by using a browser 158. The screen center 152 may then store the selected style in the screen center database 154. Upon loading of information from the screen center database 154, the property server 122 retrieves the display style information and updates the displaying style of the elevator display units 114a-b in the caches 120a-b. In some embodiments, the elevator display units 114a-b read the updated display style and display information on the elevator display 300 according to the updated style.

Having described the invention, and a preferred embodiment thereof, what we claim as new and secured by Letters Patent is:

1. A method for updating floor information for display by an elevator in a remote property, the method comprising:
   receiving, from a property server, data indicative of a floor for which the elevator lacks floor information;
   receiving, from a remotely executing process, new floor information for the floor;
   storing the new floor information in a floor information database;
   receiving, from the property server, a request identifying the remote property and requesting updated floor information for the remote property; and
   retrieving updated floor information from the floor-information database.

2. The method of claim 1, wherein the receiving new floor information comprises receiving a name of the floor.

3. The method of claim 1, wherein receiving new floor information comprises receiving information representative of an occupant of the floor.

4. The method of claim 1, wherein receiving new floor information comprises receiving data from a browser via the internet.

5. The method of claim 1, wherein receiving a request for updated floor information comprises receiving a request from the property server via the internet.

6. The method of claim 1, wherein receiving new floor information comprises receiving information representative of a use of the floor.

7. A system for updating floor information for display in elevators associated with remote properties, the system comprising:
   a processor;
   a network interface for providing communication with a network;
   a mass storage medium in communication with the processor for storage of floor information;
   wherein the processor is configured to receive, from a remote property, data indicative of a floor for which an elevator lacks floor information, to receive, from a remotely executing process, new floor information for the floor for which the elevator lacks floor information, and to store the new floor information in the main storage medium.

8. The system of claim 7, further comprising a plurality of property servers for transmitting data indicative of a floor for which the elevator lacks floor information.

9. The system of claim 8, further comprising an elevator display unit in data communication with one of the property servers.

10. The system of claim 8, wherein the property server comprises a building server.

11. The system of claim 8, wherein the property server is disposed within an elevator.

12. The system of claim 7, wherein the new floor information comprises information representative of a use of the floor.

13. A computer-readable medium having encoded thereon software for updating floor information for display by an elevator, the software comprising instructions for:
   receiving, from a property server, data indicative of a floor for which the elevator lacks floor information;
   receiving, from a remotely executing process, new floor information for the floor;
   storing the new floor information in a floor information database;
   receiving, from the property server, a request identifying the remote property and requesting updated floor information for the remote property; and
   retrieving updated floor information from the floor-information database.

14. The computer-readable medium of claim 13, wherein the instructions for receiving new floor information comprise instructions for receiving a name of the floor.

15. The computer-readable medium of claim 13, wherein the instructions for receiving new floor information comprise instructions for receiving information representative of an occupant of the floor.

16. The computer-readable medium of claim 13, wherein the instructions for receiving new floor information comprise instructions for receiving data from a browser via the internet.

17. The computer-readable medium of claim 13, wherein the instructions for receiving a request for updated floor information comprise instructions for receiving a request from the property server via the internet.

18. The computer-readable medium of claim 13, wherein the instructions for receiving new floor information comprise instructions for receiving information representative of a use of the floor.

* * * * *